(12) United States Patent
Koç et al.

(10) Patent No.: US 7,080,109 B2
(45) Date of Patent: Jul. 18, 2006

(54) METHODS AND APPARATUS FOR INCOMPLETE MODULAR ARITHMETIC

(75) Inventors: Cetin K. Koç, Corvallis, OR (US); Tugrul Yanik, Corvallis, OR (US); Erkay Savas, Corvallis, OR (US)

(73) Assignee: State of Oregon Acting by and through the State Board of Higher Education on Behalf of Oregon State University, Corvallis, OR (US)

( * ) Notice: Subject to any disclaimer, the term of this patent is extended or adjusted under 35 U.S.C. 154(b) by 700 days.

(21) Appl. No.: 09/895,835

(22) Filed: Jun. 29, 2001

(65) Prior Publication Data

US 2002/0059353 A1    May 16, 2002

Related U.S. Application Data

(60) Provisional application No. 60/215,206, filed on Jun. 29, 2000.

(51) Int. Cl.
*G06F 7/38* (2006.01)
(52) U.S. Cl. ..................................................... 708/491
(58) Field of Classification Search ........ 708/491–492; 380/28
See application file for complete search history.

(56) References Cited

U.S. PATENT DOCUMENTS

| | | | |
|---|---|---|---|
| 5,270,956 A | 12/1993 | Oruc et al. | |
| 5,274,707 A * | 12/1993 | Schlafly | 380/28 |
| 5,499,299 A | 3/1996 | Takenaka et al. | |
| 6,009,450 A | 12/1999 | Dworkin et al. | |
| 6,598,061 B1 * | 7/2003 | Symes et al. | 708/491 |

OTHER PUBLICATIONS

Yanik et al, "Incomplete reduction in modular arithmetic", Computer and Digital Techniques, IEE Proceedings-, vol.: 149, Issue: 2, Mar. pp. 46-52.*

* cited by examiner

*Primary Examiner*—Tan V. Mai
(74) *Attorney, Agent, or Firm*—Klarquist Sparkman, LLP

(57) ABSTRACT

Methods and apparatus for modular arithmetic operations with respect to a modulus p include representing operands as a series of s w-bit numbers, wherein $$s = \left\lceil \frac{k}{w} \right\rceil.$$

Operations are executed word by word and a carry, borrow, or other bit or word is obtained from operations on most significant words of the operands. Depending on the value of this bit or word, an operation-specific correction factor is applied. Cryptographic systems include computer executable instructions for such methods. Bit-level operations are generally avoided and the methods and apparatus are applicable to systems based on, for example, public-key cryptographic algorithms defined over the finite field GF(p).

16 Claims, 1 Drawing Sheet

METHODS AND APPARATUS FOR INCOMPLETE MODULAR ARITHMETIC

This application claims the benefit of Provisional Application No. 60/215,206, filed Jun. 29, 2000.

FIELD OF THE INVENTION

The invention pertains to modular arithmetic and cryptographic systems and methods using modular arithmetic.

BACKGROUND OF THE INVENTION

The basic arithmetic operations (i.e., addition, subtraction, and multiplication) in the prime finite field GF(p) have numerous applications in cryptography, such as decipherment in RSA systems, Diffie-Hellman key exchange, elliptic curve cryptography, the Digital Signature Standard (DSS), and the elliptic curve digital signature algorithm (ECDSA). These applications demand high-speed software and hardware implementations of the arithmetic operations in the field GF(p), typically for p in a range such that $160 \leq \lceil \log_2(p) \rceil \leq 2048$. Improved methods and apparatus are needed for these and other applications.

SUMMARY OF THE INVENTION

Methods of performing modular arithmetic with respect to a modulus p are provided that include representing operands A, B as respective series of s w-bit words. At least one arithmetic operation selected from the group consisting of addition, subtraction, and multiplication is performed based on the series of words of the operands to obtain an intermediate result. The intermediate result is then processed so that a corrected result C is obtained, wherein C is less than or equal to p−1 and greater than or equal to 0. In representative embodiments, a set of incompletely reduced numbers is defined based on the word size w and the modulus p and the arithmetic operation is performed so that the intermediate values used to obtain the result C are incompletely reduced numbers.

Modular addition methods are provided that include representing a first operand and a second operand as a first and a second series of words, respectively, wherein the first and the second operands have the same or different values. A series of word additions is performed between corresponding words of the first and second operands to obtain a first intermediate sum. A carry value associated with a sum of most significant words of the operands is evaluated and a correction factor for addition is added to the first intermediate sum if the carry value is one, thereby producing a second intermediate sum. According to representative embodiments, the correction factor for addition is represented as a series of words, and the step of adding the correction factor to the first intermediate sum is performed word by word. In further embodiments, the correction factor for addition is $F=2^m-Ip$, wherein m is a number of bits in s w-bit words that represent the operands, and I is a largest integer such that F is between 1 and p−1. According to additional methods, a carry value associated with a sum of most significant words of the first intermediate sum and the correction factor is evaluated and the correction factor for addition is added to the second intermediate sum if the carry value is one.

Methods for modular subtraction with respect to a modulus p are provided that include representing a first operand and a second operand as a first and a second series of words, respectively, wherein the first and the second operands have the same or different values. A series of word subtractions between corresponding words of the first and second operands is performed to obtain a first intermediate difference. A borrow value associated with a difference of most significant words of the operands is evaluated, and based on the evaluation, a correction factor for subtraction is summed with the first intermediate difference to produce a second intermediate difference. According to representative examples, the correction factor for subtraction is $G=Jp-2^m$, wherein is a maximum number of bits used to represent an operand and J is a smallest integer such that G is between 1 and p−1.

Methods of Montgomery multiplication are provided that include representing a first operand and a second operand as a first series and a second series of s w-bit words, respectively and selecting a Montgomery radix $R=2^{sw}$. Corresponding words of the first and second operands are multiplied to form word products and the word products are processed to obtain a Montgomery product.

Transaction servers are provided that include inputs configured to receive an authentication code and a processor configured to receive and confirm the authentication code, the processor including a word-wise, incomplete modular arithmetic module. According to representative examples, the arithmetic module includes computer executable instructions stored in a computer readable medium. In other examples, the processor is configured to process words of length w, and the arithmetic module is configured based on the word length w. In additional examples, the arithmetic module is configured to perform arithmetic modulo a prime number p and the arithmetic module is configured to process operands represented as s w-bit words, wherein $$s = \left\lceil \frac{k}{w} \right\rceil$$

and $k=\lceil \log_2 p \rceil$. According to further embodiments, the arithmetic module includes memory configured for storage of a correction factor for addition.

Cryptographic systems are provided that include a processor having a a word-wise, incomplete-number arithmetic processor. According to example embodiments, the arithmetic processor is configured to process a cryptographic parameter using addition, subtraction, or Montgomery multiplication based on a modulus p, wherein p is a prime number.

Methods of processing a security parameter with respect to a modulus p include representing the security parameter as a series of s w-bit words and processing the security parameter word by word to produce a processed value, wherein the processed value is between 0 and $2^{sw}-1$. An output is produced by combining the processed value with a correction factor.

Methods of processing a cryptographic parameter include selecting a word length w and a modulus p, and representing the cryptographic parameter as a series of s w-bit words, wherein $$s = \left\lceil \frac{k}{w} \right\rceil.$$

The cryptographic parameter is processed word by word to produce an intermediate result, wherein the intermediate result is an incompletely reduced number.

These and other embodiments and features of the invention are described below with reference to the accompanying drawing.

DETAILED DESCRIPTION

Figure 1:
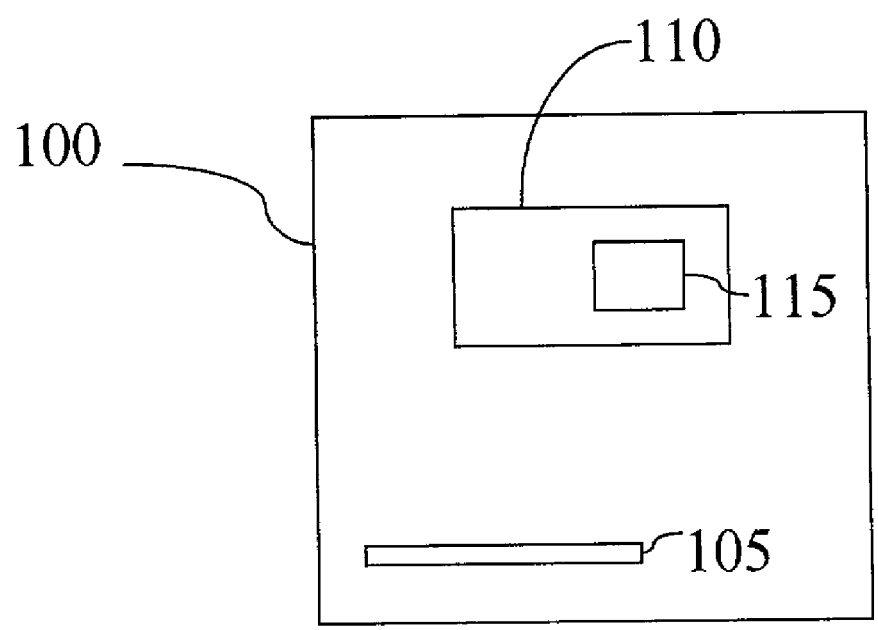
FIG. 1 is a block diagram of a transaction processor that performs customer authentication and includes a word-wise arithmetic processor based on incompletely reduced numbers.

Arithmetic in the field GF(p) is referred to as modular arithmetic with respect to a prime modulus p. The elements of the field GF(p) can be represented as members of the set of integers $\{0, 1, \ldots, (p-1)\}$, and the field GF(p) is closed with respect to the arithmetic operations of addition, subtraction, and multiplication. In many applications, the modulus p is represented as a k-bit binary number, wherein k is in the range [160, 2048]. The prime number p can be represented as an array of words, wherein each word includes w-bits. In many software implementations w=32, but w can be 8 or 16 for 8-bit or 16-bit microprocessors, respectively, but longer word lengths can be used.

Scalable methods are methods in which values of the prime modulus p and a corresponding bit length k are unrestricted. In addition, scalable methods generally do not limit the modulus p to a special form as some prime-number-specific methods require. The bit-length k of the modulus p need not be an integer multiple of the processor wordsize.

As used herein to describe representative methods, k, u, s, and m are defined as follows: $k=\lceil \log_2 p \rceil$ is a number of bits required to represent the prime modulus p; w is a word size;

$$s = \left\lceil \frac{k}{w} \right\rceil$$

is a number of words used to represent the prime modulus p; and m=sw is a total number of bits in s words.

For purposes of illustration, numbers are conveniently represented as unsigned binary numbers and two's complement arithmetic is used. An element A of the field GF(p) can be represented as s words of unsigned binary integers such that $A=(A_{s-1}A_{s-2} \ldots A_1 A_0)$, wherein words $A_i$ for $i=0, 1, \ldots, (s-1)$ include w-bit unsigned binary numbers. $A_{s-1}$ is a most significant word (MSW) of A and $A_0$ is a least significant word (LSW) of A. A bit-level representation of A is $A=(a_k \mathstrut_1 a_{k-2} \ldots a_1 a_0)$. A most significant bit (MSB) of A is $a_{k-1}$ and a least significant bit (LSB) of A is $a_0$. If k is not an integer multiple of w, then $k=(s-1)w+u$, wherein $u<w$ is a positive integer, and only the least significant u bits of the MSW $(A_{s-1})$ are needed. The most significant (w−u) bits are not needed for storing the k bits of p and these bits can be assigned zero value. This representation of the element A is summarized in Table 1.

TABLE 1

Representation of an element A of the field GF(p) with s w-bit words.

| $A_{s-1}$ | $A_{s-2}$ | ... | $A_1$ | $A_0$ |
|---|---|---|---|---|
| $\underbrace{0 \ldots 0}_{w-u} a_{(s-1)w+u-1} \ldots a_{(s-1)w}$ | $a_{(s-1)w-1} \ldots a_{(s-2)w}$ | ... | $a_{2w-1} \ldots a_w$ | $a_{w-1} \ldots a_0$ |

While the representation of the field element A of Table 1 can be used for execution of bit-level arithmetic operations in the field GF(p), such bit-level operations are generally slow and inefficient. Faster execution can be obtained based on word-level operations using incomplete modular arithmetic as illustrated below. For purposes of explanation, completely reduced numbers, partially reduced numbers, and unreduced numbers in the field GF(p) are defined as follows. Completely reduced numbers are numbers ranging from 0 to (p−1) and a set C of completely reduced numbers is the set $C=\{0, 1, \ldots (p-1)\}$. Incompletely reduced numbers are numbers ranging from 0 to $(2^m-1)$ and a set I of incompletely reduced numbers is the set $I=\{0, 1, \ldots, p-1, p, p+1, \ldots, (2^m-1)\}$. Unreduced numbers are numbers ranging from p to $(2^m-1)$ and a set U of unreduced numbers is the set $U=\{p, p+1, \ldots, (2^m-1)\}$. These sets are related as $C \subset I$, $U \subset I$, and $U=I-C$.

For $A \in C$ there typically are one or more associated incompletely reduced numbers $B \in I$ such that $A=B \pmod p$. The incompletely reduced number(s) B can be converted to the completely reduced number A by subtracting integer multiples of p from B. Arithmetic operations can be performed with B instead of A. The elements of the set I use all bits of the s words (i.e., completely occupy the s words) as shown in Table 2.

TABLE 2

Representation of incompletely reduced numbers as s w-bit words.

| $B_{s-1}$ | $B_{s-2}$ | ... | $B_1$ | $B_0$ |
|---|---|---|---|---|
| $b_{sw-1} \ldots b_{(s-1)w}$ | $b_{(s-1)w-1} \ldots b_{(s-2)w}$ | ... | $b_{2w-1} \ldots b_w$ | $b_{w-1} \ldots b_0$ |

Arithmetic operations performed based on incompletely reduced numbers can avoid bit-level operations on the MSW. Word-level operations can be performed and checks for carry bits performed at word boundaries, not within words. In addition, reductions by p can be avoided until an output is needed that is in the set C.

Implementation of the subtraction operation requires a representation of negative numbers and positive numbers. A least positive residues representation can be used that permits representation of positive and negative numbers modulo-p. In such a representation, numbers remain positive. For example, if the result of a subtraction operation is a negative number, then the negative result is converted to a positive number by adding p. For example, for p=7, the operation s=3−4 is performed as s=3−4+7=6. The numbers from 0 to (p−1)/2 can be interpreted as positive numbers modulo-p, while the numbers from $(p-1)/2+1$ to $p-1$ can be interpreted as negative numbers modulo-p.

As a specific example of the representation described above, let the prime modulus $p=11=(1011)$ and a word size $w=3$ bits. Then $k=4$ bits and $s=\lceil k/w \rceil=\lceil 4/3 \rceil=2$ words so that $m=2\cdot 3=6$ bits. The completely reduced set $C=\{0, 1, \ldots, 9, 10\}$ and the incompletely reduced set $I=\{0, 1, \ldots, 62, 63\}$. Incompletely reduced numbers occupy 2 words as $A=(A_1A_0)=(a_5a_4a_3\ a_2a_1a_0)$. For example, the decimal number 44 is represented as (101 100) in binary or (5 4) in octal. An incompletely reduced number (or numbers) B associated with a number A is obtained as $B=A+i\cdot p$, wherein B is in the range [0, 63] and i is a positive integer. For example, if $A=5$, then associated incompletely reduced numbers are $\{5, 16, 27, 38, 49, 60\}$. The incompletely reduced representation is redundant and is denoted as, for example, $\overline{5}=\{5, 16, 27, 38, 49, 60\}$ to represent the residue class $\overline{5}$. In general, $\overline{A}$ is referred to as the residue class of A.

Cryptographic methods and apparatus are described that include arithmetic operations based on incompletely reduced numbers. Representative methods are described below.

Modular Addition of Incompletely Reduced Numbers

Incompletely reduced numbers can be as large as $2^m-1$ and some reduction operations are typically avoided because numbers are not restricted to the range $[0,p-1]$. For example, elements A, B of GF(p) are added to produce a sum X, such that $X:=A+B\ (\bmod\ p)$. If X does not exceed $2^m$, no reduction is performed. Reduction is performed if there is a non-zero carry-out from addition of the MSWs of A and B. For convenience, the notation $(c, S_i)$ is defined as $$(c, S_i) := A_i + B_i + c \tag{1}$$

and indicates a word-level addition operation that adds one-word numbers $A_i$ and $B_i$ and a one-bit carry-in c to produce a one-bit carry-out c and a one-word sum $S_i$. (The one-bit carry c is referred to as both a carry-out and a carry-in.) A representative addition method is summarized in Table 3.

TABLE 3

Modular addition using incomplete numbers.

| | |
|---|---|
| Inputs: | $A = (A_{s-1} \ldots A_1A_0)$ and $B = (B_{s-1} \ldots B_1B_0)$ |
| Auxiliary: | $F = (F_{s-1} \ldots F_1F_0)$ |
| Output: | $X = (X_{s-1} \ldots X_1X_0)$ |
| Step 1: | $c := 0$ |
| Step 2: | for $i = 0$ to $s - 1$ |
| Step 3: | $(c, S_i) := A_i + B_i + c$ |
| Step 4: | if $c = 0$ then return $X = (S_{s-1} \ldots S_1S_0)$ |
| Step 5: | $c := 0$ |
| Step 6: | for $i = 0$ to $s - 1$ |
| Step 7: | $(c, T_i) := S_i + F_i + c$ |
| Step 8: | if $c = 0$ then return $X = (T_{s-1} \ldots T_1T_0)$ |
| Step 9: | $c := 0$ |
| Step 10: | for $i = 0$ to $s - 1$ |
| Step 11: | $(c, U_i) := T_i + F_i + c$ |
| Step 12: | return $X = (U_{s-1} \ldots U_1U_0)$ |

If the carry-out c from the addition of the MSWs of A and B is zero, then Step 4 of Table 3 produces the correct sum as $X=S=(S_{s-1} \ldots S_1S_0)$. If the carry-out $c=1$, then the carry-out is initially disregarded to obtain $S:=S-2^m$ and then S is corrected in steps 5–8. In modulo-p arithmetic, integer multiples of p can be added or subtracted to numbers without changing values computed modulo-p. Accordingly, S is corrected as $T:=(S-2^m)+F$, wherein $F=(F_{s-1} \ldots F_1F_0)$ is called a correction factor for addition and is defined as $$F=2^m-Ip, \tag{2}$$

wherein I is largest integer that brings F into the range $[1, p-1]$, i.e., $I=\lfloor 2^m/p \rfloor$. F is precomputed and saved. By performing the operation $T:=(S-2^m)+F$, a modulo-p reduction is performed as $$T:=(S-2^m)+F=S-2^m+2^m-Ip=S-Ip. \tag{3}$$

Thus, the result $X=T$ is correct modulo-p after Step 8. However, the operation $T:=S+F$ can cause a carry-out from the MSWs of S and T. The input operands A and B are arbitrary numbers and can be as large as $2^m-1$, so that a maximum sum $S=2^{m+1}-2$. By ignoring the carry-out c of Step 3, $S=2^m-2$ is obtained. Therefore, the computation $T:=S+F$ in Step 7 can produce T that is greater than $2^m$ and an additional correction can be performed in Steps 9–11. After Step 11, the maximum value of U is less than $2^m$ and the carry-out $c=0$. This is summarized as follows:

$$U=(T-2^m)+F=2^m-2-2^m+F=-2+F \leq -2+p-1 < 2^m. \tag{4}$$

Thus, corrections are applied as needed, and the sum is returned as a completely reduced number.

ADDITION EXAMPLES

Let $p=11$, $k=4$, $w=3$, $m=6$, $s=2$, so that $$F=2^m-\lfloor 2^m/p \rfloor \cdot p=64-\lfloor 2^6/11 \rfloor \cdot 11=64-5\cdot 11=9. \tag{5}$$

The addition of $\overline{4}=\{4, 15, 26, 37, 48, 59\}$ and $\overline{5}=\{5, 16, 27, 38, 49, 60\}$ is illustrated using, for example, the incompletely reduced numbers 26 and 27.

$S = 26 + 27$ $\quad = 53 \qquad (c = 0$ so Step 4 returns sum$)$

Because $c=0$ at Step 4, no correction is needed. Note that 53 is an element of the residue class $\overline{9}=\{9, 20, 31, 42, 53\}$.

In another example, a first correction (Steps 5–8) is used. Addition of $\overline{4}=\{4, 15, 26, 37, 48, 59\}$ and $\overline{5}\{5, 16, 27, 38, 49, 60\}$ using incompletely reduced numbers 37 and 49 is carried out as $S = 37 + 49$ $\quad = 86 \qquad (c = 1$ so Step 4 does not return sum$)$ $\quad = 86 - 64 \quad$ (carry ignored in Steps 5-7)

$\quad = 22$ $T = 22 + 9 \quad$ (apply correction in Steps 5-7)

$\quad = 31 \qquad (c = 0$ so Step 8 returns sum$)$

The result is correct because 31 is equivalent to $\overline{9}=\{9, 20, 31, 42, 53\}$.

In another example, a second correction of Steps 9–12 is used. This second correction is similar to that of Steps 5–8 in that the correction factor F is added to a prior result. The addition of $\overline{6}=\{6, 17, 28, 39, 50, 61\}$ and $\overline{7}=\{7, 18, 29, 40, 51, 62\}$ using the incompletely reduced numbers 61 and 62 is:

$$S = 61 + 62$$
$$= 123 \quad (c = 1 \text{ so Step 4 does not return sum})$$
$$= 123 - 64 \quad (\text{ignore carry})$$
$$= 59$$
$$T = 59 + 9 \quad (\text{apply correction in Steps 5-7})$$
$$= 68 \quad (c = 1 \text{ so Step 8 does not return sum})$$
$$= 68 - 64 \quad (\text{ignore carry})$$
$$= 4$$
$$U = 4 + 9 \quad (\text{apply correction in Steps 9-11})$$
$$= 13 \quad (\text{return sum in Step 12})$$

This result is correct since 13 is in an element of the residue set $\overline{2}=\{2, 13, 24, 35, 46, 57\}$.

Modular Subtraction of Incompletely Reduced Numbers

Modular subtraction can be performed using two's complement arithmetic. Input operands can be in the least positive residues representation and operands are represented as incompletely reduced numbers. For convenience, $$(b, S_i) := A_i - B_i - b \tag{6}$$

denotes a word-level subtraction operation in which a one-word number $B_i$ and a one-bit borrow-in b are subtracted from a one-word number $A_i$ to produce a one-word number $S_i$ and a one-bit borrow-out b. The one-bit borrow b is referred to as both a borrow-in and a borrow-out. A representative subtraction method for computing $X = A-B \pmod{p}$ is summarized in Table 4.

TABLE 4

Modular Subtraction Using Incomplete Numbers

| | |
|---|---|
| Inputs: | $A = (A_{s-1} \ldots A_1 A_0)$ and $B = (B_{s-1} \ldots B_1 B_0)$ |
| Auxiliary: | $G = (G_{s-1} \ldots G_1 G_0)$ and $F = (F_{s-1} \ldots F_1 F_0)$ |
| Output: | $X = (X_{s-1} \ldots X_1 X_0)$ |
| Step 1: | $b := 0$ |
| Step 2: | for $i = 0$ to $s - 1$ |
| Step 3: | $(b, S_i) := A_i - B_i - b$ |
| Step 4: | if $b = 0$ then return $X = (S_{s-1} \ldots S_1 S_0)$ |
| Step 5: | $c := 0$ |
| Step 6: | for $i = 0$ to $s - 1$ |
| Step 7: | $(c, T_i) := S_i + G_i + c$ |
| Step 8: | if $c = 0$ then return $X = (T_{s-1} \ldots T_1 T_0)$ |
| Step 9: | $c := 0$ |
| Step 10: | for $i = 0$ to $s - 1$ |
| Step 11: | $(c, U_i) := T_i + F_i + c$ |
| Step 12: | return $X = (U_{s-1} \ldots U_1 U_0)$ |

If $b=0$ after Step 4, then the result is positive reduced number. If $b=1$, then the result is negative, and a two's complement result is obtained as $$S := A - B = A + 2^m - B. \tag{7}$$

The result S is in the range $[0, 2^m-1]$ but is incorrectly reduced, i.e., $2^m$ has been added. This is corrected by adding $G = (G_{s-1} \ldots G_1 G_0)$, wherein G is a correction factor for subtraction defined as $$G = Jp - 2^m, \tag{8}$$

wherein J is the smallest integer that brings G into the range $[1, p-1]$, i.e., $J = \lceil 2^m/p \rceil$. The sum of the correction factors for addition and subtraction $F+G=p$ because $$F+G = 2^m - Jp + Jp - 2^m = (J-I)p = (\lceil 2^m/p \rceil - \lfloor 2^m/p \rfloor)p = p, \tag{9}$$

so that $G = p - F$ or $F = p - G$. The result S is corrected to obtain T in Steps 5–8. After the correction of S in Step 8, a further correction is determined as $$T = S + G = A + 2^m - B + Jp - 2^m = A - B + Jp. \tag{10}$$

Similar to Step 8 of the addition method of Table 3, this correction can cause a carry from operand MSWs, requiring another correction that is performed in Steps 9–11. No further correction is needed after Step 12, since the maximum value $S=(2^m-1)$ gives $$U \leq (2^m-1) + G - 2^m + F = -1 + p < 2^m. \tag{11}$$

SUBTRACTION EXAMPLES

Let $p=11$, $k=4$, $w=3$, $m=6$, $s=2$, so that G is $$G = \lceil 2^m/p \rceil p - 2^m = \lceil 2^6/11 \rceil \cdot 11 - 64 = 6 \cdot 11 - 64 = 2. \tag{12}$$

Because $F+G=p$, G can also be obtained as $G=p-F=11-9=2$. The subtraction operation $S:=5-7$ is illustrated using the incompletely reduced equivalents 49 and 40 of $\overline{5}$ and $\overline{7}$, respectively, wherein $\overline{5}=\{5, 16, 27, 38, 49, 60\}$ and $\overline{7}=\{7, 18, 29, 40, 51, 62\}$.

$$S = 49 - 29$$
$$= 20 \quad (b = 0 \text{ return Step 4})$$

This result is correct since 20 is an incompletely reduced number in the residue class $\overline{9}=\{9, 20, 31, 42, 53\}$ and $5-7=-2=9 \pmod{11}$.

The same subtraction operation $S:=5-7$ using the incompletely reduced equivalents 16 and 40 is performed as $$S = 16 - 40$$
$$= -24 \quad (b = 1 \text{ so Step 4 does not return difference})$$
$$= 64 - 24 \quad (\text{two's complement Step 4})$$
$$= 40$$
$$T = 40 + 2 \quad (\text{apply correction Steps 5-8})$$
$$= 42 \quad (c = 0 \text{ so return difference in Step 8})$$

The incompletely reduced number 42 is also correct because 42 is an element of the residue class $\overline{9}=\{9, 20, 31, 42, 53\}$.

In another example, the correction (Steps 9–12) is used. The residue classes associated with 5 and 6 are $\overline{5}=\{5, 16, 27, 38, 49, 60\}$ and $\overline{6}=\{6, 17, 28, 39, 50, 61\}$, respectively. The subtraction operation 5–6 is performed using incompletely reduced numbers 49 and 50:

$$S = 49 - 50$$
$$= -1 \quad (b = 1 \text{ so Step 4 does not return difference})$$

-continued

| | |
|---|---|
| = 64 − 1 | (two's complement Step 4) |
| = 63 | |
| T = 63 + 2 | (apply correction Steps 5-8) |
| = 65 | (c = 1 so Step 8 does not return difference) |
| = 65 − 64 | (ignore carry Step 8) |
| = 1 | |
| U = 1 + 9 | (apply correction Steps 9-11) |
| = 10 | (return difference in Step 12) |

The result is correct because 10≡−1 (mod 11).

Montgomery Modular Multiplication

Modular multiplication of operands A and B to obtain a product C:=AB (mod p), typically requires reduction operations to reduce the product AB by multiples of the modulus p. Reduction operations typically use bit-level shift-subtract operations, but word-level operations are generally more efficient. Reduction operations can be avoided using so-called Montgomery modular multiplication that is described in, for example, P. L. Montgomery, "Modular Multiplication without Trial Division," *Mathematics of Computation* 44:519–521 (1985). A Montgomery product of operands A, B is defined as:

$$T := ABR^{-1} \pmod{p}, \quad (13)$$

wherein R is an integer such that gcd(R,p)=1. Generally R is selected as the smallest power of 2 that is larger than p, i.e., $R=2^k$, wherein $k=\lceil \log_2 p \rceil$. Thus, 1<p<R and 2p>R. If k is not an integer multiple of the word-length w, then bit-level operations can be necessary. Bit-level operations can be avoided with $R=2^m$, wherein m=sw.

According to a representative method, a Montgomery multiplication method uses incompletely reduced numbers. Operands A and B that are in the range [0, $2^m-1$], are processed to obtain an incompletely reduced result T, also in the range [0, $2^m-1$]. T is obtained based on Equation (13). Montgomery multiplication computes the result T based on $$T = \frac{AB + p(ABp' \bmod R)}{R}, \quad (14)$$

wherein p' is selected such that $$RR^{-1} - pp' = 1, \quad (15)$$

and $R^{-1}$ is a modular multiplicative inverse of R. Incomplete Montgomery multiplication is performed by receiving operands A, B that are in the range [0, R−1] and computing a result T according to Equation (14). Because A, B<R, the maximum value of T is $$\frac{(R-1)(R-1) + p(R-1)}{R} = \frac{(R-1)(R-1+p)}{R} < R - 1 + p. \quad (16)$$

Therefore, T can exceed R only by an additive factor p, so that a single subtraction of p can return T to the range [0, R−1].

A word-level description of Montgomery multiplication can be described based on a word-level multiplication operation written as $$(c, T_j) := T_j + A_i \cdot B_j + c, \quad (17)$$

in which a new value of $T_j$ and a new carry word c are computed using a previous value of $T_j$, 1-word operands $A_i$, $B_j$, and a carry word c. The quantities $A_i$, $B_j$, $T_j$, c are one-word numbers in the range [0, $2^w-1$]. Because $$(2^w-1)+(2^w-1)\cdot(2^w-1)+(2^w-1)=(2^w-1)(2^w+1)=2^{2w}-1, \quad (18)$$

the result of the operation in (17) is a 2-word number represented using the 1-word numbers $T_j$ and c.

Various implementations of Montgomery multiplication are described in, for example, C. K. Koc et al., "Analyzing and Comparing Montgomery Multiplication Algorithms," *IEEE Micro* 16:26–33 (1996). An algorithm that computes T using a least significant word of p' defined by Equation (15) is presented below. Since $R=2^{sw}$, Equation (15) can be reduced modulo $2^w$ to obtain $$-pp' \equiv 1 \pmod{2^w} \quad (19)$$

Let $P_0$ and $Q_0$ be the LSWs of p and p', respectively. Then, $Q_0$ is a negative of the multiplicative inverse of the LSW of p modulo $2^w$, i.e., $$Q_0 = -P_0^{-1} \pmod{2^w}. \quad (20)$$

This one-word number can be computed very quickly using a variation of the extended Euclidean algorithm given in S. R. Dusse and B. S. Kaliski, "A Cryptographic Library for the Motorola DSP56000," in *Lecture Notes in Computer Science*, vol. 473 (Springer Verlag, 1990). A Montgomery multiplication method for computing $T=AB2^{-m} \pmod p$ using $Q_0$ is summarized in Table 5.

TABLE 5

Montgomery Modular Multiplication Using Incompletely Reduced Numbers

| | |
|---|---|
| Inputs: | $A = (A_{s-1} \ldots A_1 A_0)$ and $B = (B_{s-1} \ldots B_1 B_0)$ |
| Auxiliary: | $Q_0$ and $p = (P_{s-1} \ldots P_1 P_0)$ |
| Output: | $T = (T_{s-1} \ldots T_1 T_0)$ |
| Step 1: | for j = 0 to s − 1 |
| Step 2: | $T_j := 0$ |
| Step 3: | for i = 0 to s − 1 |
| Step 4: | c := 0 |
| Step 5: | for j = 0 to s − 1 |
| Step 6: | $(c, T_j) := T_j + A_i \cdot B_j + c$ |
| Step 7: | $T_s := c$ |
| Step 8: | $M := T_0 \cdot Q_0 \pmod{2^w}$ |
| Step 9: | $c := (T_0 + M \cdot P_0)/2^w$ |
| Step 10: | for j = 1 to s − 1 |
| Step 11: | $(c, T_{j-1}) := T_j + M \cdot P_j + c$ |
| Step 12: | $(c, T_{s-1}) := T_s + c$ |
| Step 13: | if c = 0 return $T = (T_{s-1} \ldots T_1 T_0)$ |
| Step 14: | b := 0 |
| Step 15: | for j = 0 to s − 1 |
| Step 16: | $(b, T_j) := T_j - P_j - b$ |
| Step 17: | return $T = (T_{s-1} \ldots T_1 T_0)$ |

In Steps 1 and 2, words of the result T are assigned zero values. The final result $T=AB2^{-m} \pmod p$ is stored as s-words. An initial multiplication loop (Steps 3–7) computes a partial product T of length s+1. For i=0, T:=$A_0 \cdot B$. Because $A_0 \in [0, 2^{w-1}]$ and $B \in [0, 2^{m-1}]$, then $$T \leq 2^{w-1} \cdot 2^{m-1} = 2^{w-1} \cdot 2^{sw-1} = 2^{(s+1)w-2}.$$

In Steps 8–12, T is reduced modulo-p so that T is s words long. This is accomplished using the following substeps. First, in Step 8, the LSW of T is multiplied by $Q_0$ modulo $2^w$. $Q_0$ is the LSW of p' and is equal to $-P_0^{-1} \pmod{2^w}$. Thus, a one-word number M is $$M := T_0 \cdot Q_0 = T_0 \cdot (-P_0^{-1}) = -T_0 P_0^{-1} \pmod{2^w}.$$

In Step 9, $T_0 + M \cdot P_0$ is computed and is equal to $$X := T_0 + M \cdot P_0 := T_0 + (-T_0 P_0^{-1}) P_0.$$

Note that X is a 2-word number, however, the LSW of X is zero since $$T_0 + (-T_0 P_0^{-1}) P_0 = 0 \pmod{2^w}.$$

Therefore, after division by $2^w$ in Step 9, a 1-word carry c from the computation $T_0 + M \cdot P_0$ is obtained. In Steps 10–12, computation of T+M·P is completed. Since the LSW of the result is zero, the result is shifted by 1 word to the right (towards the least significant bit) in order to obtain the s-word number given by Equation (14).

According to Equation (16), the result computed at the end of Step 12 can exceed R−1 by at most p, and thus, a single subtraction can return the result to the range [0, R−1]. In Step 13, the value of the carry is checked. If the carry is 1, T exceeds R−1. If the carry is 0, then the result T is returned in Step 13 as the final product. Otherwise, a subtraction T:=T−p is performed to return T to the range [0, R−1]. The subtraction operation is accomplished in Steps 14–16, and the final product is returned in Step 17.

Therefore, this Montgomery modular multiplication method works even if the modulus $R=2^{sw}$ is much larger than p, i.e., it need not be the smallest number of the form $2^i$ which is larger than p. While there may be several correction steps needed in the addition and subtraction operations, a single subtraction operation is sufficient for computing the Montgomery product $T=AB2^{-sw} \pmod p$.

One important difference between incomplete and complete Montgomery multiplication pertains to the manner in which the input and output operands are specified. The radix R in complete Montgomery multiplication is $R=2^k$, while incomplete Montgomery multiplication uses the value $2^{sw}$, and avoids bit-level operations, even if k is not an integer multiple of w. Complete Montgomery multiplication requires that input operands be complete, i.e., numbers in the range [0, p−1], while the incomplete Montgomery multiplication algorithm requires that input operands be in the range [0, $2^m$−1]. Complete Montgomery multiplication computes a final result as a completely reduced number, i.e., a number in the range [0, p−1], while incomplete Montgomery multiplication computes the result in the range [0, $2^m$−1].

MULTIPLICATION EXAMPLES

Let p=53, k=4, w=3, m=6, and s=2. Since p=53=(110101) and $P_0$=(101)=5, $Q_0 = -P_0^{-1} \pmod{2^w}$ is $$Q_0 = -5^{-1} \pmod 8 = -5 = 3,$$

and $R = 2^m = 2^6 = 64$. These values are used to describe two representative examples. In a first example, a product of operands of $\overline{5} = \{5, 58\}$ and $\overline{7} = \{7, 60\}$ using the incompletely reduced numbers 58 and 60 is obtained. With A=58=(111 010) and B=60=(111 100), e $T = A \cdot B \cdot R^{-1} \pmod p$ is determined according to the method of Table 5 as follows:

TABLE 6

Montgomery Multiplication of the Incompletely Reduced Numbers 58 and 60.

| Step 3: | i = 0 |
|---|---|
| Step 4, 5, 6 and j = 0: | (c, $T_0$) := $A_0 \cdot B_0$ = 2 · 4 = 8 = (001 000). |
| Step 5, 6 and j = 1: | (c, $T_1$) := $A_0 \cdot B_1$ + c = 2 · 7 + 1 = 15 = (001 111). |
| Step 7: | $T_2$ = c = 1 so that T = (001 111 000) |
| Step 8: | M = $T_0 \cdot Q_0$ = 0 · 3 (mod 8) = 0. |
| Step 9: | c = ($T_0$ + M · $P_0$)/8 = (0 + 0 · 5)/8 = 0. |
| Step 10, 11 and j = 1: | (c, $T_0$) = $T_1$ + M · $P_1$ + c = 7 + 0 · 6 + 0 = 7 = (000 111). |
| Step 12: | (c, $T_1$) = $T_2$ + c = 1 + 0 = 1 = (000 001) so that T = (001 111). |
| Step 3: | i = 1 |
| Step 4, 5, 6 and j = 0: | (c, $T_0$) := $T_0$ + $A_1 \cdot B_0$ = 7 + 7 · 4 = 35 = (100 011). |
| Step 5, 6 and j = 1: | (c, $T_1$) := $T_1$ + $A_1 \cdot B_1$ + c = 1 + 7 · 7 + 4 = 54 = (110 110). |
| Step 7: | $T_2$ = c = 6 so that T = (110 110 011). |
| Step 8: | M = $T_0 \cdot Q_0$ = 3 · 3 (mod 8) = 1. |
| Step 9: | c = ($T_0$ + M · $P_0$)/8 = (3 + 1 · 5)/8 = 1. |
| Step 10, 11 and j = 1: | (c, $T_0$) = $T_1$ + M · $P_1$ + c = 6 + 1 · 6 + 1 = 13 = (001 101). |
| Step 12: | (c, $T_1$) = $T_2$ + c = 6 + 1 = 7 = (000 111) and T = (111 101). |
| Step 13: | Since c = 0, return T = (111 101). |

The result is the incomplete number T=(111 101)=61. A corresponding complete number is 8 that is equal to $5 \cdot 7 \cdot 64^{-1} \pmod{53}$.

In a second example, a product of $\overline{8} = \{8, 61\}$ and $\overline{10} = \{10, 63\}$ using the incompletely reduced numbers 61 and 63 is obtained. With A=61=(111 101) and B=63=(111 111), $T = A \cdot B \cdot R^{-1} \pmod p$ is determined using the method of Table 5 including subtraction steps (Steps 14-17). The second example is summarized in Table 7.

TABLE 7

Montgomery Multiplication of the Incompletely Reduced Numbers 61 and 63.

| Step 3: | i = 0 |
|---|---|
| Step 4, 5, 6 and j = 0: | (c, $T_0$) := $A_0 \cdot B_0$ = 5 · 7 = 35 = (100 011). |
| Step 5, 6 and j = 1: | (c, $T_1$) := $A_0 \cdot B_1$ + c = 5 · 7 + 4 = 39 = (100 111). |
| Step 7: | $T_2$ = c = 4 so that T = (100 111 011) |
| Step 8: | M = $T_0 \cdot Q_0$ = 3 · 3 (mod 8) = 1. |
| Step 9: | c = ($T_0$ + M · $P_0$)/8 = (3 + 1 · 5)/8 = 1. |
| Step 10, 11 and j = 1: | (c, $T_0$) = $T_1$ + M · $P_1$ + c = 7 + 1 · 6 + 1 = 14 = (001 110). |
| Step 12: | (c, $T_1$) = $T_2$ + c = 4 + 1 = 5 = (000 101) and T = (101 110). |
| Step 3: | i = 1 |
| Step 4, 5, 6 and j = 0: | (c, $T_0$) := $T_0$ + $A_1 \cdot B_0$ = 6 + 7 · 7 = 55 = (110 111). |
| Step 5, 6 and j = 1: | (c, $T_1$) := $T_1$ + $A_1 \cdot B_1$ + c = 5 + 7 · 7 + 6 = 60 = (111 100). |
| Step 7: | $T_2$ = c = 6 and T = (110 110 011). |
| Step 8: | M = $T_0 \cdot Q_0$ = 7 · 3 (mod 8) = 5. |
| Step 9: | c = ($T_0$ + M · $P_0$)/8 = (7 + 5 · 5)/8 = 4. |
| Step 10, 11 and j = 1: | (c, $T_0$) = $T_1$ + M · $P_1$ + c = 4 + 5 · 6 + 4 = 38 = (100 110). |
| Step 12: | (c, $T_1$) = $T_2$ + c = 7 + 4 = 11 = (001 011). |
| Step 13: | Since c = 1, execute the subtraction steps below. |
| Step 14: | b = 0. |
| Step 15, 16 and j = 0: | (b, $T_0$) = $T_0$ − $P_0$ − b = 6 − 5 − 0 = 1 = (000 001). |

TABLE 7-continued

Montgomery Multiplication of the Incompletely Reduced Numbers 61 and 63.

Step 15, 16 and j = 1: (b, $T_1$) = $T_1$ - $P_1$ - b =
3 - 6 - 0 = -3 (mod 8) = 5(000 101).
Step 17: Return T = (101 001) = 41.

The result is the completely reduced number T=(101 001)=41 that corresponds to $8 \cdot 10 \cdot 64^{-1}$ (mod 53).

Incomplete addition, subtraction, and Montgomery multiplication methods have been implemented in C-language instructions for use on a 450-MHz Pentium II computer with 256 megabytes of memory and a WINDOWS NT operating system. For comparison, conventional (complete) operations were also implemented and execution times and speed-up for incomplete and complete operations are summarized in Table 8. Speed-up is calculated by subtracting the incomplete execution time from the complete execution time and dividing by the complete execution time. As can be seen from Table 5, incomplete addition is 34%–43% faster than complete addition in the range of k from 161 to 256. Similarly, incomplete subtraction is 17%–23% faster than complete subtraction. The speed-up of the incomplete subtraction is less than that for incomplete addition due to the number of correction steps used in subtraction. Only a 3%–5% speed-up is obtained for incomplete Montgomery multiplication since incomplete and complete Montgomery have similar numbers of steps. Table 8. Execution times (in μsec) and speed-up (%) for incomplete and complete arithmetic operations.

TABLE 9

Signature generation times (in msec) for ECDSA over GF(p).

| k | C code only | | | C + Assembly |
|---|---|---|---|---|
| | Complete | Incomplete | % | Incomplete |
| 161 | 13.6 | 12.0 | 12 | 5.3 |
| 176 | 14.8 | 12.9 | 13 | 5.8 |
| 192 | 16.5 | 14.7 | 11 | 6.6 |
| 193 | 20.8 | 18.4 | 12 | 8.5 |
| 208 | 22.6 | 19.7 | 13 | 9.1 |
| 224 | 23.7 | 21.1 | 11 | 9.7 |
| 225 | 29.8 | 26.5 | 11 | 12.2 |
| 240 | 31.1 | 27.9 | 10 | 12.8 |
| 256 | 34.2 | 30.8 | 10 | 14.0 |

Improved cryptographic methods and apparatus based on incomplete arithmetic include cryptographic systems and software modules that determine cryptographic parameters and, for example, produce ciphertext from plaintext or recover plaintext from ciphertext. Similar operations are also used in digital signature authentication and production and other security applications. In a particular application, one or more of the incomplete arithmetic methods operations can be implemented as a series of computer-readable instructions for execution with a general purpose computer or application-specific processor. Such methods and apparatus can include one or more of the incomplete arithmetic operations.

The arithmetic methods described above can be applied to cryptographic parameters such as public keys, private keys, ciphertext, plaintext, digital signatures, and other parameters and combinations of parameters.

| | Addition | | | Subtraction | | | Multiplication | | |
|---|---|---|---|---|---|---|---|---|---|
| κ | Complete | Incomplete | % | Complete | Incomplete | % | Complete | Incomplete | % |
| 161 | 1.85 | 1.11 | 40 | 1.43 | 1.10 | 23 | 4.80 | 4.58 | 5 |
| 176 | 1.90 | 1.11 | 42 | 1.38 | 1.10 | 20 | 4.74 | 4.57 | 4 |
| 192 | 2.00 | 1.26 | 37 | 1.38 | 1.04 | 25 | 4.79 | 4.62 | 4 |
| 193 | 1.98 | 1.23 | 38 | 1.47 | 1.20 | 18 | 6.36 | 6.17 | 3 |
| 208 | 2.14 | 1.22 | 43 | 1.46 | 1.19 | 18 | 6.40 | 6.13 | 4 |
| 224 | 2.03 | 1.28 | 37 | 1.45 | 1.16 | 20 | 6.35 | 6.17 | 3 |
| 225 | 2.20 | 1.30 | 41 | 1.58 | 1.29 | 18 | 8.06 | 7.73 | 4 |
| 240 | 2.23 | 1.32 | 41 | 1.53 | 1.27 | 17 | 8.03 | 7.74 | 4 |
| 256 | 2.31 | 1.52 | 34 | 1.53 | 1.27 | 17 | 8.02 | 7.76 | 3 |

In addition to the above examples, ECDSA over the finite field GF(p) as described in, for example, National Institute for Standards and Technology, "Digital Signature Standard (DSS)," FIPS Pub. 186-2 (2000), has been implemented to estimate performance improvements achievable with incomplete arithmetic. Execution times (in msec) for the ECDSA signature generation operation are listed in Table 9. These times were obtained without precomputation of any values. ECDSA code was executed several hundred times using two different random elliptic curve sets for bit lengths as specified in Table 9. The implementation results show that the ECDSA algorithm can be executed 10%–13% faster using incomplete modular arithmetic. Coupled with some machine-level programming, the ECDSA algorithm can be made even faster, as shown in the last column of Table 9.

With reference to FIG. 1, a financial transaction apparatus 100 includes customer input 105 configured to receive customer data such as customer identification parameters and one or more customer security codes. The apparatus 100 also includes a processing unit 110 that receives customer parameters and codes, and processes at least one of the codes to authenticate the customer identification. An arithmetic module 115, under control of the processing unit 110, is used to perform at least some steps of authentication. The module 115 is configured to execute word by word (word-wise) arithmetic using incompletely reduced numbers. Such a module is referred to as a word-wise, incomplete arithmetic unit. In some examples, a general purpose computer executes modular arithmetic operations using instructions stored in a computer readable medium such as a hard disk, floppy disk, CD-ROM, or in a volatile or non-volatile memory. Upon authenticating the customer codes, the apparatus responds to transaction requests provided to the input 105 or otherwise provided.

Other apparatus and applications having a modular arithmetic component include encryption systems, decryption systems, digital signature systems, and data verification systems. Some specific examples are transaction servers and systems for processing and retrieval of sensitive information such as patient medical records, customer data, vendor data, and other personal or financial data. Representative apparatus that include such arithmetic processing are SmartCards, cell phones, and servers, including servers for Internet-based applications. The incomplete arithmetic methods and apparatus provide rapid execution using simple processors and have modest storage requirements and are therefore suited for power and cost sensitive applications. Because the methods and apparatus provide rapid execution, they are suitable for applications requiring processing of numerous transactions. In addition, because the methods are scalable, they are readily adapted for variable cryptographic parameter sizes, such as increasing bit lengths for keys.

While the invention has been described with reference to several examples, it will be apparent to those skilled in the art that these examples can be modified in arrangement and detail. We claim all that is encompassed by the appended claims.

What is claimed is:

1. A transaction server, comprising:
an input configured to receive an authentication code; and
a processor configured to receive and confirm the authentication code, the processor including a word-wise, incomplete modular arithmetic module, wherein the arithmetic module is configured to perform arithmetic modulo a prime number p and to process operands represented as an integer number s of w-bit words, wherein $$s = \left\lceil \frac{k}{w} \right\rceil$$

and k is an integer such that $k=\lceil \log_2 p \rceil$.

2. The transaction server of claim 1, wherein the arithmetic module includes computer executable instructions stored in a computer readable medium.

3. The transaction server of claim 1, wherein the processor is configured to process words of length w, and the arithmetic module is configured based on the word length w.

4. The transaction server of claim 1, wherein the arithmetic module includes memory configured for storage of a correction factor for addition.

5. The transaction server of claim 1, wherein the arithmetic module includes memory configured for storage of a correction factor for subtraction.

6. A cryptographic system, comprising a processor that includes a word-wise, incompletely-reduced-number arithmetic module, wherein the processor includes an input configured to receive a series of s w-bit words associated with a cryptographic parameter, an output configured to deliver an incompletely reduced number based on the series of words, and memory configured to store a value of a Montgomery radix $R=2^{sw}$.

7. A cryptographic system, comprising a processor that includes a word-wise, incompletely-reduced-number arithmetic module, wherein the word-wise, incompletely-reduced-number arithmetic module includes:

an input configured to receive a first operand and a second operand as a first and a second series of words, respectively, wherein the first and the second operands have the same or different values; and a processor configured to execute a series of word additions between corresponding words of the first and second operands to obtain a first intermediate sum and evaluate a carry value associated with a sum of most significant words of the operands, and based on the evaluation of the carry value, add a correction factor for addition to the first intermediate sum to produce a second intermediate sum, wherein the correction factor for addition is $F=2^m-Ip$, wherein m is a maximum number of bits in the words that represent the operands, p is a modulus, and I is a largest integer such that F is between 1 and p−1.

8. A cryptographic system, comprising a processor that includes a word-wise, incompletely-reduced-number arithmetic module, wherein the word-wise, incompletely-reduced-number arithmetic module includes:

memory configured to represent a first operand and a second operand as a first and a second series of words, respectively, wherein the first and the second operands have the same or different values: and a processor configured to execute a series of word subtractions between corresponding words of the first and second operands to obtain a first intermediate difference, evaluate borrow value associated with a difference of most significant words of the operands, and add a correction factor for subtraction to the first intermediate difference based on the evaluation of the borrow value to produce a second intermediate difference, wherein the correction factor for subtraction is $G=Jp-2^m$, wherein m is a maximum number of bits used to represent an operand, p is a modulus, and J is a smallest integer such that G is between 1 and p−1.

9. A cryptographic system, comprising a processor that includes a word-wise, incompletely-reduced-number arithmetic module, wherein the word-wise, incompletely-reduced-number arithmetic module includes:

a first input and a second input configured to receive a first operand and a second operand as a first series and a second series of s w-bit words, respectively;

an input configured to receive a Montgomery radix $R=2^{sw}$; and the processor is configured to multiply corresponding words of the first and second operands to form word products and obtain a Montgomery product based on the Montgomery radix and a prime modulus p.

10. The cryptographic system of claim 9, further comprising memory configured to receive a correction factor based on a negative inverse of a least significant word of a representation of the prime modulus p as a series of words of length w.

11. A cryptographic system, comprising a processor that includes a word-wise, incompletely-reduced-number arithmetic module, wherein the word-wise, incompletely-reduced-number arithmetic module includes:

a memory configured to store representations of at least one cryptographic parameter as a series of s w-bit words;

wherein the a processor is configured to process the cryptographic parameter word by word to produce a processed value, wherein the processed value is between 0 and $2^{sw}-1$; and an output configured to deliver an output value based on a combination of the processed value and a correction factor, wherein the correction factor is determined based on the value of $2^{sw}$.

12. The method of claim 11, wherein the processor is configured to determine the correction factor based on a carry or borrow value produced with a most significant word of the cryptographic parameter.

13. A cryptographic system, comprising a processor that includes a word-wise, incompletely-reduced-number arithmetic module, wherein the word-wise, incompletely-reduced-number arithmetic module includes:

an input associated with selection of a modulus p;

a memory configured to represent the cryptographic parameter as a series of s w-bit words, wherein s is an integer, an integer k is given by $k=\lceil \log_2 p \rceil$, and $$s = \left\lceil \frac{k}{w} \right\rceil;$$

and the processor is configured to process the cryptographic parameter word by word to produce an intermediate value that is represented as an incompletely reduced number.

14. The cryptographic system of claim 13, wherein the arithmetic module is configured to process the cryptographic parameter using addition modulo-p, wherein p is a prime number.

15. The cryptographic system of claim 13, wherein the arithmetic module is configured to process the cryptographic parameter using subtraction modulo-p, wherein p is a prime number.

16. The cryptographic system-of claim 13, wherein the arithmetic module is configured to process the cryptographic parameter using Montgomery multiplication with respect to a modulus p, wherein p is a prime number.

* * * * *